United States Patent
Oshihara et al.

(10) Patent No.: US 8,623,106 B2
(45) Date of Patent: Jan. 7, 2014

(54) FLUID REFORMING APPARATUS FOR MAINTAINING THERMAL CONDUCTIVITY OF A FLUID IN A FLOW CHANNEL

(75) Inventors: Kenzo Oshihara, Yokohama (JP); Ryuuta Yamaguchi, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 416 days.

(21) Appl. No.: 12/373,406

(22) PCT Filed: Aug. 3, 2007

(86) PCT No.: PCT/JP2007/065680
§ 371 (c)(1),
(2), (4) Date: Jan. 12, 2009

(87) PCT Pub. No.: WO2008/016191
PCT Pub. Date: Feb. 7, 2008

(65) Prior Publication Data
US 2009/0252653 A1    Oct. 8, 2009

(30) Foreign Application Priority Data

Aug. 4, 2006 (JP) ................................ 2006-213213
Jul. 31, 2007 (JP) ................................ 2007-198633

(51) Int. Cl.
*B01J 7/00* (2006.01)
(52) U.S. Cl.
USPC ............................................................. 48/61
(58) Field of Classification Search
USPC ................ 48/61–118.5, 127.9; 422/129, 242; 429/400–535
See application file for complete search history.

(56) References Cited

U.S. PATENT DOCUMENTS

| 4,600,825 A | 7/1986 | Blazejovsky |
| 4,807,584 A | 2/1989 | Davis |
| 5,237,975 A | 8/1993 | Betki et al. |
| 5,799,867 A | 9/1998 | Misawa |

(Continued)

FOREIGN PATENT DOCUMENTS

| DE | 43 35 866 A1 | 4/1994 |
| EP | 0 022 876 A1 | 1/1981 |

(Continued)

OTHER PUBLICATIONS

U.S. Appl. No. 12/373,411, filed Jan. 12, 2008, Oshihara et al.

(Continued)

*Primary Examiner* — Imran Akram
(74) *Attorney, Agent, or Firm* — Foley & Lardner LLP

(57) ABSTRACT

A fluid reforming apparatus of the present invention includes: a flow channel (30) in which a catalyst (1) is fixed to an inner wall; a fluid heating device (40) which heats a fluid to be reformed by the catalyst (1) and/or heats the catalyst (1) in the flow channel (30); catalyst temperature measuring devices (51, 52, 53, 54) which measure temperatures of the catalyst (1); and a pressure control device (10, 20, 60) which controls a pressure of the fluid in the flow channel so that the fluid can have a target pressure. The pressure control device (10, 20, 60) increases the target pressure when a difference between the temperatures of the catalyst (1) in a flow direction of the fluid exceeds a predetermined value during a period while the fluid in the flow channel (30) is being heated up to a target temperature.

12 Claims, 9 Drawing Sheets

(56) References Cited

U.S. PATENT DOCUMENTS

| | | | |
|---|---|---|---|
| 5,927,087 A | 7/1999 | Ishikawa | |
| 6,430,949 B2 | 8/2002 | Noro et al. | |
| 6,561,017 B1 | 5/2003 | Claussen et al. | |
| 2003/0159354 A1* | 8/2003 | Edlund et al. | 48/127.9 |
| 2004/0265225 A1* | 12/2004 | Watson et al. | 423/652 |
| 2006/0156627 A1* | 7/2006 | Brantley et al. | 48/61 |
| 2007/0028602 A1* | 2/2007 | Betta et al. | 60/286 |

FOREIGN PATENT DOCUMENTS

| | | |
|---|---|---|
| EP | 0 032 003 A1 | 7/1981 |
| EP | 0 419 743 A1 | 4/1991 |
| JP | 61-135974 A | 6/1986 |
| JP | 2004-162586 A | 6/2004 |
| JP | 2004-257334 A | 9/2004 |
| JP | 2005-180222 A | 7/2005 |
| JP | 2006-183469 A | 7/2006 |

OTHER PUBLICATIONS

K. Oshihara et al., USPTO Notice of Allowance, U.S. Appl. No. 12/373,411, Nov. 29, 2011, 8 pgs.

K. Oshihata et al., USPTO Non-Final Office Action, U.S. Appl. No. 12/373,411, Jun. 9, 2011, 10 pgs.

* cited by examiner

US 8,623,106 B2

FLUID REFORMING APPARATUS FOR MAINTAINING THERMAL CONDUCTIVITY OF A FLUID IN A FLOW CHANNEL

TECHNICAL FIELD

The present invention relates to a fluid reforming apparatus, and to a fluid reforming method using the same. More specifically, the present invention relates to a fluid reforming apparatus that highly maintains thermal conductivity of a fluid (fuel) in a flow channel by controlling a pressure of the fluid, thus making it possible to avoid scorch of the fuel and sintering of a catalyst, which are caused by local heating of the fluid in the vicinity of an inner wall of the flow channel.

BACKGROUND ART

Heretofore, in a fuel reformer, fuel at a temperature ranging from room temperature (25° C.) to 500° C. is fed into a reaction container, and is reformed therein (refer to Japanese Patent Unexamined Publication No. S61-135974).

DISCLOSURE OF INVENTION

FIG. 1 shows a heat conduction state in the case of reforming the fuel by heating the fuel from an outside of a pressure-resistant container. In the case of feeding the fuel into the pressure-resistant container from an arrow direction in FIG. 1 and heating the fuel in the container from the outside, it is considered that, in the vicinity of a pipe wall 2 on which a catalyst 1 is provided, a molecular motion becomes stronger, and the fuel becomes gaseous. In this case, a region 1 in which the fuel is vaporized occurs in the container, and a fuel density is decreased in the region 1. Accordingly, thermal conductivity of the fuel in the region 1 is significantly decreased. As a result, the fuel in the vicinity of such an inner wall of the pipe becomes locally heated.

In the case where the fuel is locally heated, molecules (hot spots) which become extremely hot exist partially when the fuel is hydrocarbon, alcohol or the like. Then, the fuel molecules which have become extremely hot cause thermal decomposition, and sometimes cause carbon deposition. Specifically, as shown in FIG. 2, in the region 1 in which the fuel is vaporized, the fuel molecules cause the thermal decomposition, and sometimes form a carbon-deposited region 4. Moreover, in the catalyst 1 in the vicinity of the pipe wall 2, sintering of the catalyst 1 is sometimes accelerated by the fact that the fuel becomes hot.

The inventors of the present invention found out the following as measures against the above-described phenomena. Specifically, a pressure of the fuel is increased, whereby the fuel density in the vicinity of the inner wall is retained, the decrease of the thermal conductivity of the fuel as a fluid is avoided, and accordingly, such local heating can be avoided, and the carbon deposition and the sintering of the catalyst can be suppressed. Specifically, the inventors of the present invention found out that the carbon deposition and the sintering of the catalyst can be suppressed in such a manner that, as shown in FIG. 3, the pressure of the fuel to be thus fed is increased, and the occurrence of the region 1 in which the fuel is vaporized is prevented.

The present invention has been made in consideration for the above-described problems inherent in the background art and for the above-described new findings. It is an object of the present invention to provide a fluid reforming apparatus capable of avoiding the local heating in the flow channel and suppressing the carbon deposition (occurrence of scorch and caulking) and the sintering of the catalyst, and to provide a fluid reforming method using the fluid reforming apparatus.

A fluid reforming apparatus according to an aspect of the present invention includes: a flow channel in which a catalyst is fixed to an inner wall; a fluid heating device which heats a fluid to be reformed by the catalyst and/or heats the catalyst in the flow channel; catalyst temperature measuring devices which measure temperatures of the catalyst; and a pressure control device which controls a pressure of the fluid in the flow channel so that the fluid can have a target pressure, wherein the pressure control device increases the target pressure when a difference between the temperatures of the catalyst in a flow direction of the fluid exceeds a predetermined value during a period while the fluid in the flow channel is being heated up to a target temperature.

BEST MODE FOR CARRYING OUT THE INVENTION

Figure 1:
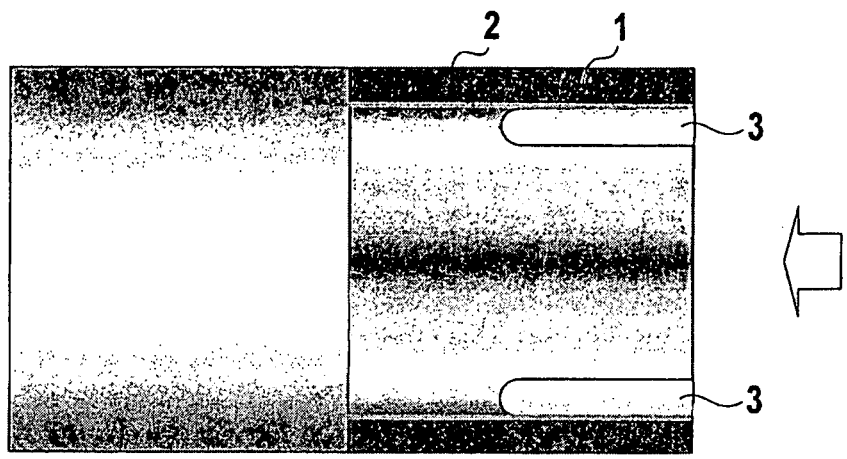
FIG. 1 is a schematic view showing a heat conduction state in a case of reforming fuel by heating the fuel from an outside of a pressure-resistant container.
Figure 2:
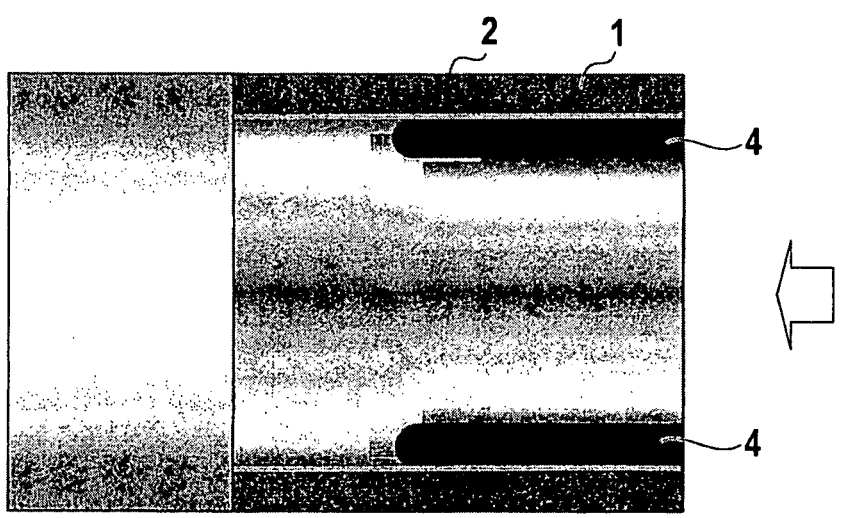
FIG. 2 is a schematic view showing a heat conduction state in the case of reforming the fuel by heating the fuel from the outside of the pressure-resistant container.
Figure 3:
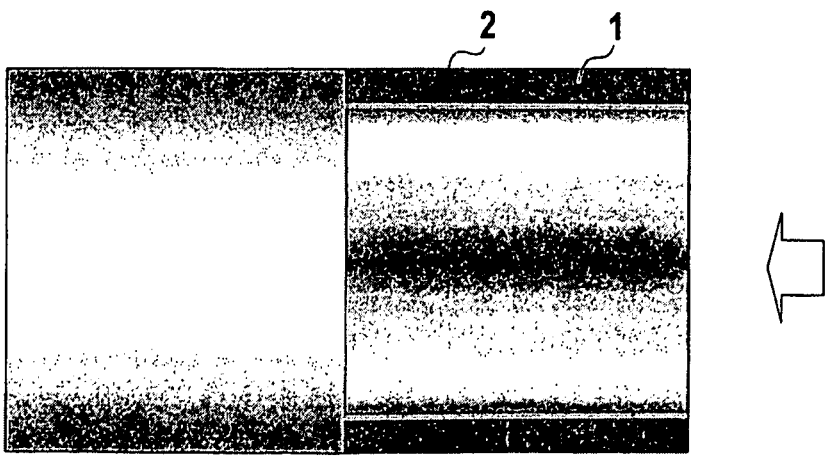
FIG. 3 is a schematic view showing a heat conduction state in a case to which the present invention is applied, the case being of reforming the fuel by heating the fuel from an outside of a flow channel.

A description will be made below in detail of a fluid reforming apparatus of the present invention.

The fluid reforming apparatus of the present invention includes; a fuel reforming catalyst fixed to an inner wall of a flow channel; a fluid heating device provided in or outside of the flow channel; and catalyst temperature measuring devices provided in the flow channel and a pressure control device. By these constituents, the fluid heating device heats a fluid in the flow channel up to a target temperature at the time of reforming the fluid in the flow channel. Moreover, the pressure control device pressurizes the fluid up to a target pressure. Then, the catalyst reforms such a fluid component.

Moreover, in the fluid reforming apparatus of the present invention, the pressure control device increases the target pressure when a difference between temperatures of the catalyst in a flow direction of the fluid, which are sensed by the catalyst temperature measuring devices, exceeds a predetermined value during a period while the fluid in the flow channel is being heated up to the target temperature.

With such a configuration, fuel reserved in a fuel tank is transferred to the flow channel in which the catalyst is disposed, and is reformed therein. Specifically, the fuel in the flow channel is heated up to the target temperature while the pressure thereof is being controlled, whereby the fuel can be reformed while a temperature distribution difference of the fuel is being reduced from an upstream side of the fuel channel to a downstream side thereof.

As mentioned above, in the case where the pressure of the fuel is low at the time of heating the fuel, the fuel boils and becomes gaseous. In such a gaseous portion of the fuel, thermal conductivity of the fuel is decreased radically. Accordingly, the fluid and/or the catalyst, which exists between the gaseous portion and a heater (fluid heating device), is locally heated since heat does not conduct to the gaseous portion. Therefore, caulking of the fuel occurs, and sintering of the catalyst is accelerated. However, the caulking of the fuel and the sintering of the catalyst can be avoided by the fluid reforming apparatus of the present invention.

In the fluid reforming apparatus of the present invention, heptane, gasoline, light oil, liquefied natural gas, liquefied petroleum gas, biofuel or arbitrary combinations thereof are usable as the above-described fuel. Moreover, as well as each of the above-described fuels is usable singly, gasoline containing methanol, hybrid fuel of the gas and the gasoline, and the like are usable.

The above-described flow channel just needs to be a container capable of withstanding a pressure equal to or more than critical pressures of the fuel and a reactant to be described later. Specifically, as the above-described flow channel, containers capable of withstanding 2 to 100 MPa, for example, containers made of Inconel, Hastelloy and a titanium alloy are usable.

The above-described flow channel is coupled to the fuel tank through a pipe, and has a feeding hole therein. Moreover, a discharge hole and another pipe, which are for supplying the reformed fuel to the outside, can also be arranged. It is desirable that such pipes be heat resistant and pressure resistant, and for example, pipes made of Inconel, Hastelloy and the titanium alloy are usable.

The above-described pressure control device just needs to pressurize the fuel up to the critical pressures of the fuel and the reactant to be described later or more. Specifically, as the pressure control device, devices which can pressurize the fuel up to 2 to 100 MPa, for example, high-pressure pumps are usable. Moreover, it is desirable that the pressure control device includes a fluid pressure sensor, and for example, a usual corrosion-resistant high pressure sensor is usable.

The above-described fluid heating device just needs to be able to heat the fluid up to a target reaction temperature. Specifically, as the fluid heating device, a device that can heat the fluid up to 200 to 600° C., for example, an electric heater and a heat exchanger are usable.

As the above-described catalyst temperature measuring devices, for example, a combination of temperature sensors arranged in an inside of a catalyst coating layer and at a place apart from a surface of the catalyst coating layer by a fixed distance is usable. As the temperature sensors, thermocouples and platinum resistance thermometer sensors are usable. By the above-described catalyst temperature measuring devices, a temperature difference can be obtained between the inside of the catalyst coating layer and the place apart from the surface of the catalyst coating layer by the fixed distance. Note that, in the case where a distance between the inside of the catalyst coating layer and the place apart from the surface of the catalyst coating layer by the fixed distance is already known, a temperature gradient can be obtained between the inside and the place.

Although depending on a type of the fuel, the above-described catalyst is not particularly limited as long as it is suitable for a target reforming reaction. As the reforming reaction, a reaction of reforming hydrocarbon such as heptane and the gasoline into hydrogen and carbon dioxide is mentioned.

As the above-described catalyst, there is usable: a catalyst in which noble metal such as platinum, rhodium, iridium, palladium, gold and silver is supported on a metal oxide or a composite oxide, such as alumina, titania, zirconia and ceria; a catalyst made of a metal oxide such as vanadium oxide, molybdenum oxide and tungsten oxide; or the like.

Next, a description will be made of the fluid reforming apparatus of the present invention by using the drawing.

Figure 7:
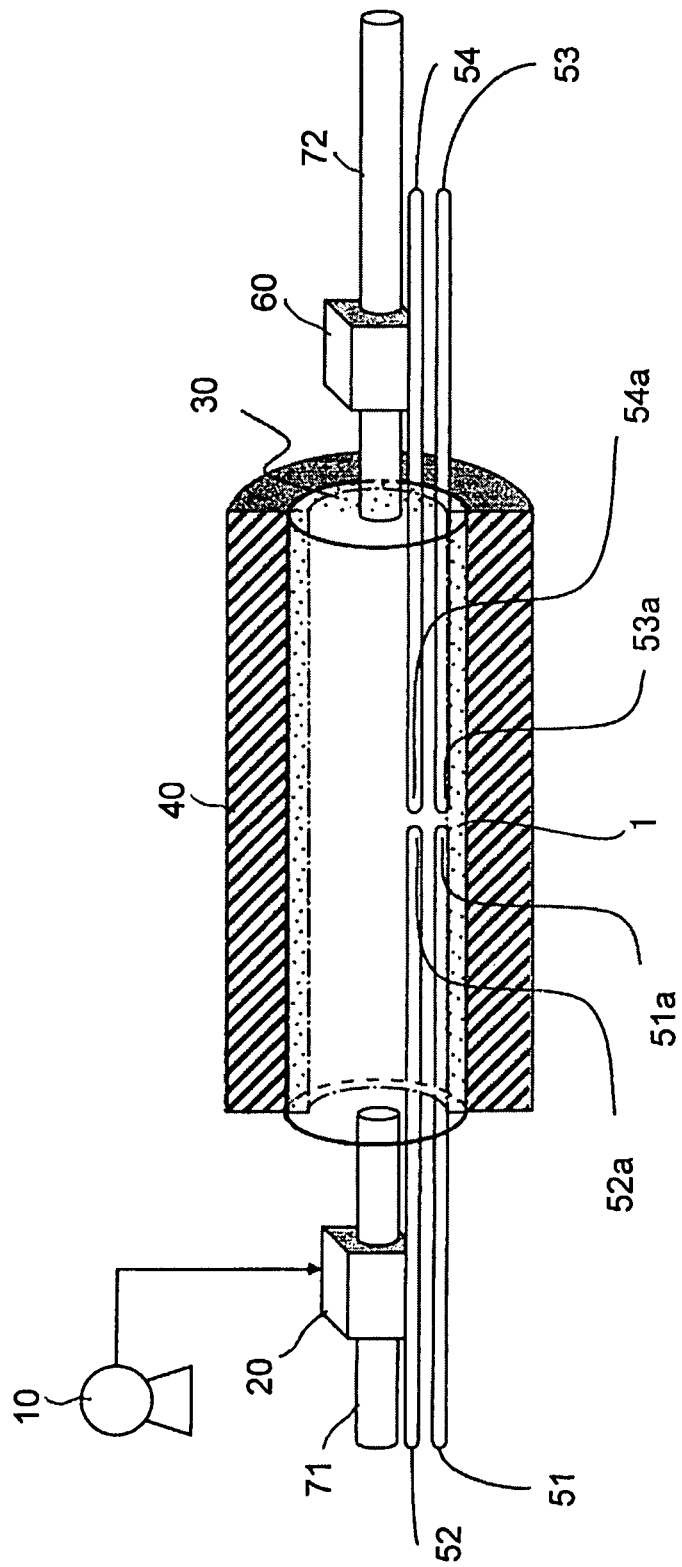
FIG. 7 is a perspective explanatory view of an embodiment of a fluid reforming apparatus of the present invention, in which a part of a heater is shown to be cut away.

FIG. 7 is a perspective view of an embodiment of the fluid reforming apparatus of the present invention, in which a part of a heater is shown to be cut away. As shown in FIG. 7, the fluid reforming apparatus of this embodiment includes: a high-pressure pump 10; a pressure sensor 20; a tubular heating chamber 30 in which a catalyst 1 is disposed on an inner wall; a heater 40; thermocouples 51, 52, 53 and 54 as examples of the catalyst temperature measuring devices; a pressure holding device 60; a fuel inlet portion 71; and a fuel outlet portion 72. The heating chamber 30 corresponds to the above-described flow channel. The heating chamber 30 and the heater 40 cooperate with each other, and function as the fluid heating device. The high-pressure pump 10, the pressure sensor 20 and the pressure holding device 60 cooperate with one another, and function as the pressure control device. Note that a capillary, a pressure keeping valve and the like are usable as the pressure holding device 60. Moreover, the pressure holding device 60 may include a cooler according to needs.

In the fluid reforming apparatus of this embodiment, first, by a pressure from the high-pressure pump 10, the fuel taken in from the fuel inlet portion 71 is fed into the heating chamber 30 heated by the heater 40. The fuel thus fed is heated up to the target temperature in the heating chamber 30, and the entirety or a part of the fuel is reformed by the catalyst. After being reformed, the fuel passes through the pressure holding device 60, and is taken out from the fuel outlet portion 72.

Then, during a period until the temperature of the fuel in the heating chamber 30 reaches the target temperature, when values obtained by subtracting predicted temperatures from measured temperatures are negative, a pressure control for increasing the target pressure is performed by using the pressure control device. Here, the predicted temperatures are predicted temperatures of two thermocouples 51 and 52 arranged on an upstream side in a flow direction of the fluid, which are predicted from temperatures measured by temperature measuring spots 51a and 52a thereof, and from a temperature difference therebetween, and the measured temperatures are temperatures measured by temperature measuring spots 53a and 54a of two thermocouples 53 and 54 arranged on a downstream side in the flow direction. Specifically, in the case where the measured temperatures of the thermocouples 53 and 54 on the downstream side are lower than the predicted temperatures of the thermocouples 51 and 52 on the upstream side, the high-pressure pump 10, the pressure sensor 20 and the pressure holding device 60 cooperate with one another, and perform the pressure control for increasing the target pressure.

Figure 8:
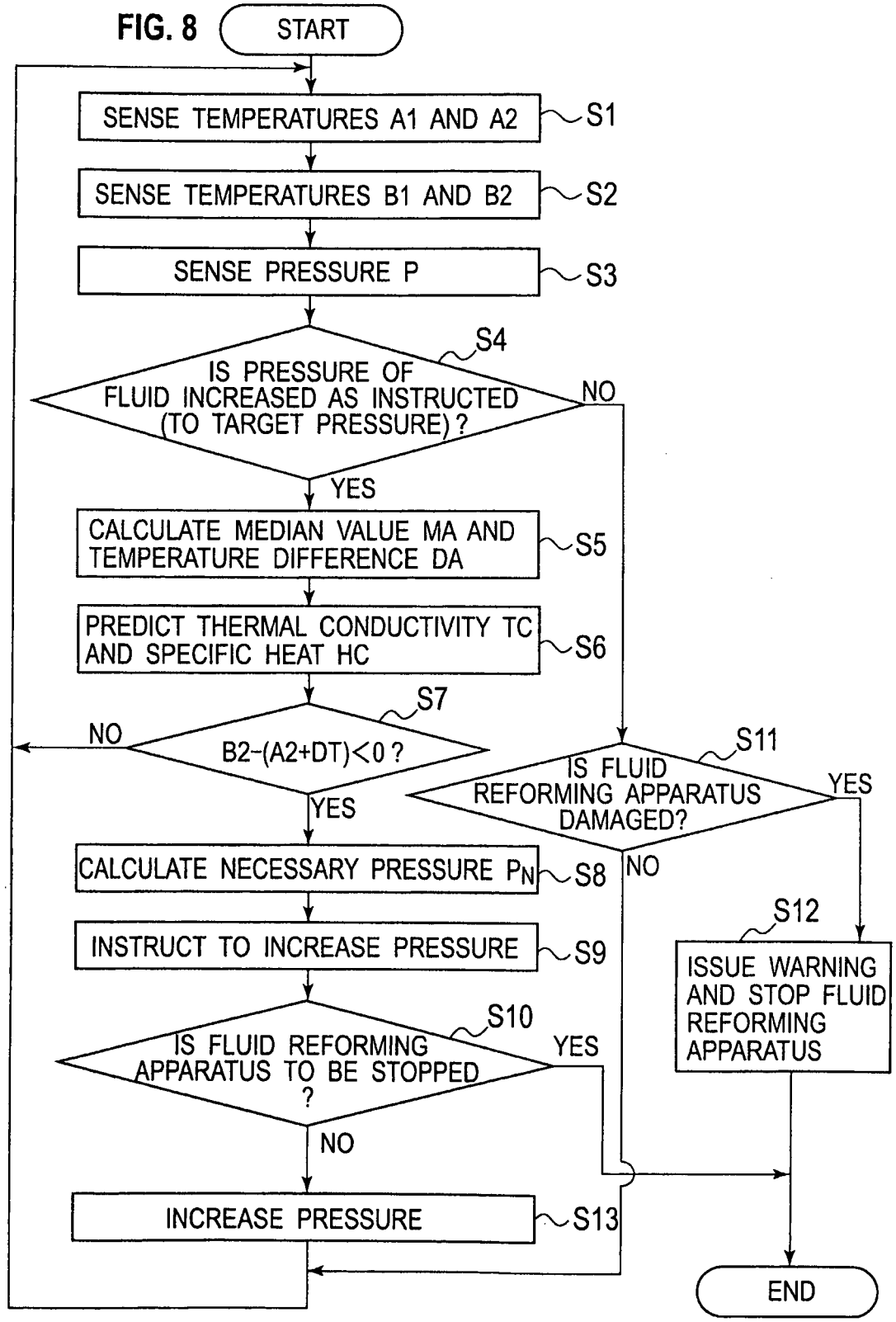
FIG. 8 is a flowchart showing an example of a control flow in the fluid reforming apparatus shown in FIG. 7.

A description will be made of an example of a control flow in the above-described fluid reforming apparatus by using the drawing. FIG. 8 is a flowchart showing the example of the control flow in the above-described fluid reforming apparatus.

First, in Step S1, a fluid temperature A1 on the temperature measuring spot 51a in the vicinity of the catalyst is sensed by the thermocouple 51, and a fluid temperature A2 on the temperature measuring spot 52a is sensed by the thermocouple 52. Then, the control flow proceeds to Step S2.

In Step S2, a fluid temperature B1 on the temperature measuring spot 53a in the vicinity of the catalyst is sensed by the thermocouple 53, and further, a fluid temperature B2 on the temperature measuring spot 54a is sensed by the thermocouple 54. Then, the control flow proceeds to Step S3.

In Step S3, a fluid pressure P is sensed by the pressure sensor 20, and the control flow proceeds to Step S4.

In Step S4, it is determined whether or not the pressure of the fluid is increased as instructed (to the target pressure). In the case where the pressure of the fluid is increased to the target pressure (in the case of YES), the control flow proceeds to Step S5. Meanwhile, in the case where the pressure of the fluid is not increased to the target pressure (in the case of NO), the control flow proceeds to Step S11.

In Step S5, a temperature median value MA and a temperature difference DA are calculated from the sensed temperatures A1 and A2, and the control flow proceeds to Step S6. Specifically, the temperature median value MA is calculated in accordance with Expression 1, and the temperature difference DA is calculated in accordance with Expression 2.

$$MA = \frac{A1 + A2}{2}$$ [Math. 1]

$$DA = A1 - A2$$ [Math. 2]

In Step S6, thermal conductivity TC and specific heat HC of the fluid are predicted from the sensed pressure P and the calculated temperature median value MA, and the control flow proceeds to Step S7. Specifically, the thermal conductivity TC is calculated in accordance with Expression 3, and the specific heat HC is calculated in accordance with Expression 4.

$$TC = f(MA, P)$$ [Math. 3]

$$HC = g(MA, P)$$ [Math. 4]

In Step S7, in accordance with Expression 5, a heat transfer amount Q is calculated from a product of the calculated temperature difference DA, the predicted thermal conductivity TC and a distance d1 (a distance between the temperature measuring spot 51a and the temperature measuring spot 52a). Moreover, in accordance with Expression 6, a transit time T obtained by dividing a distance d2 between the two temperature measuring spots 51a and 53a by a linear velocity R of a center of the temperature measuring spots 51a, 52a, 53a and 54a is calculated. Next, in accordance with Expression 7, a temperature change predicted value DT obtained by dividing a product of the heat transfer amount Q and the transit time T by the specific heat HC of the fluid is calculated. Furthermore, a value is obtained by subtracting the sum of A2 of the temperature measuring spot 52a and DT from the value of B2 of the temperature measuring spot 54a in accordance with Expression 8. In the case where the value thus obtained becomes negative (in the case of YES), the control flow proceeds to Step S8. Meanwhile, in the case where the above-described value does not become negative (in the case of NO), the control flow proceeds to Step S1.

$$Q = TC \times DA/d1$$ [Math. 5]

$$T = d2/R$$ [Math. 6]

$$DT = Q/HC \times T$$ [Math. 7]

$$B2 - (A2 + DT)$$ [Math. 8]

In Step S8, a necessary pressure PN is calculated, and the control flow proceeds to Step S9.

In Step S9, the pressure increase is instructed, and the control flow proceeds to Step S10.

In Step S10, it is determined whether or not to stop the fluid reforming apparatus. In the case where it is determined to stop the fluid reforming apparatus (in the case of YES), the control flow proceeds to END. Meanwhile, in the case where it is determined not to stop the fluid reforming apparatus (in the case of NO) as a result of the determination in Step S10, the control flow proceeds to Step S13.

In Step S11, it is determined whether or not the fluid reforming apparatus is damaged. In the case where it is determined that the fluid reforming apparatus is damaged (in the case of YES), the control flow proceeds to Step S12. Meanwhile, in the case where it is determined that the fluid reforming apparatus is not damaged (in the case of NO) as a result of the determination in Step S11, the control flow proceeds to Step S13.

In Step S12, a warning is issued, the fluid reforming apparatus is stopped, and the control flow proceeds to END.

In Step S13, the pressure is increased, and the control flow proceeds to Step S1.

Note that, in the fluid reforming apparatus of this embodiment, the two thermocouples 51 and 52 are provided on the upstream side of the heating chamber 30 of the flow channel, and the two thermocouples 53 and 54 are provided on the downstream side thereof. Then, when the temperature difference between the temperature measuring spot 51a of the thermocouple 51 and the temperature measuring spot 53a of the thermocouple 53 is a predetermined value or more, it is determined that the thermal conductivity is poor, that is, that the fuel becomes gaseous. Then, the pressure to the fuel is increased, whereby the control is performed so that the fuel can become liquid. Here, the predetermined value just needs to be set depending on the type of the fuel, and specifically, can be set to be 5° C.

Moreover, in FIG. 7, in view of positions, the temperature measuring spots 51a and 52a of the thermocouples 51 and 52 on the upstream side and the temperature measuring spots 53a and 54a of the thermocouples 53 and 54 are provided at a center portion of the flow direction of the fluid in the heating chamber 30. However, the positions of the temperature measuring spots of the thermocouples are not limited to the center of the heating chamber, and the temperature measuring spots may be provided at any positions in the heating chamber 30 as long as the temperature difference in the catalyst 1 can be measured. Moreover, it is not necessary that the number of thermocouples be two on the upstream side and two on the downstream side, and the number of thermocouples may be one on each of the upstream and downstream sides.

Next, a description will be made in detail of a fluid reforming method using the above-described fluid reforming apparatus.

In the present invention, at the time of reforming the fuel by using the above-described fluid reforming apparatus, the pressure of the fuel is controlled so that the thermal conductivity of the fuel existing in the vicinity of the catalyst can be 0.06 W·m$^{-1}$ K$^{-1}$ or more. In such a way, the local heating is suppressed, whereby deterioration of the catalyst and the carbon deposition can be avoided.

Specifically, when the fuel is heated in order to be reformed, in usual, as a density of the fuel is decreased, the thermal conductivity of the fuel itself is decreased, and accordingly, a heat insulation state occurs in the vicinity of the catalyst, and a high-temperature region occurs locally. In the present invention, the thermal conductivity of the fuel is set at 0.06 W·m$^{-1}$ K$^{-1}$ or more by controlling the pressure thereof, whereby such local heating can be suppressed.

In particular, in the case where the catalyst itself is used as a heat source by causing an oxidation reaction on the catalyst, when the thermal conductivity of the fuel is decreased, the catalyst portion becomes locally hot, and the sintering of the catalyst is accelerated. Therefore, it is recommended that the control of the above-described thermal conductivity be satisfied at least in a range of 1 mm or less from the surface of the catalyst coating layer.

Moreover, in the fluid reforming method in the present invention, it is preferable to control the pressure of the fuel at the critical pressure or more. Basically, the fuel does not become gaseous by maintaining the fuel at the critical pressure or more, and accordingly, the heat insulation state of the fuel can be avoided. Moreover, in the case where the decrease of the fuel density occurs, the pressure of the fuel is increased to the critical pressure or more, whereby the local heating is suppressed, thus making it possible to avoid the deterioration of the catalyst and the occurrence the caulking.

As mentioned above, heptane, the gasoline, the liquefied natural gas, the liquefied petroleum gas, the biofuel or the arbitrary combinations thereof are usable as the fuel.

Figure 4:
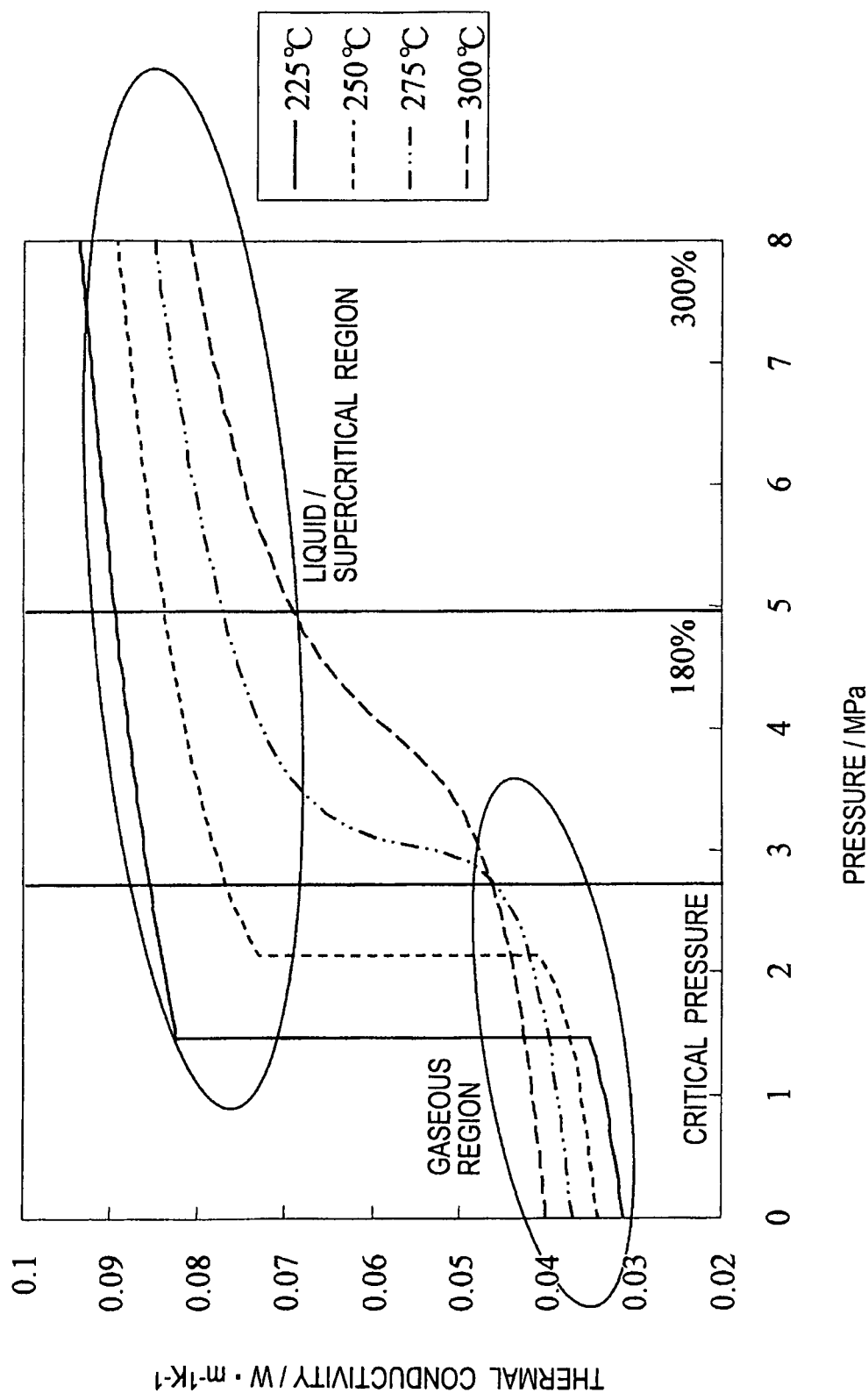
FIG. 4 is a graph showing changes of thermal conductivity of heptane.

In the case of using heptane as the fuel, as shown in FIG. 4, the pressure of the fuel just needs to be controlled to enter a supercritical state.

Moreover, in the case of controlling the fuel to turn to a liquid state, it is preferable to control the pressure of the fuel at 180% or more of the critical pressure. In such a way, in the case of using the gasoline as the fuel, the thermal conductivity of 0.06 W·m$^{-1}$ K$^{-1}$ or more can be maintained even if the fuel is heated up to around 300° C. as the temperature of the fuel. In other words, the fuel as a subject to be heated can be suppressed from becoming gaseous in a temperature range up to around 300° C., whereby the fuel can be reformed while avoiding the deterioration of the catalyst and the occurrence of the caulking.

Furthermore, it is more preferable to control the pressure of the fuel at 300% or more of the critical pressure. In such a way, in the case of using the light oil or the like as the fuel, the thermal conductivity of 0.06 W·m$^{-1}$ K$^{-1}$ or more can be maintained even if the fuel is heated up to around 500° C. as the temperature range. In other words, the fuel as the subject to be heated can be suppressed from becoming gaseous in the temperature range up to around 500° C., whereby the fuel can be reformed while avoiding the deterioration of the catalyst and the occurrence of the caulking.

Figure 5:
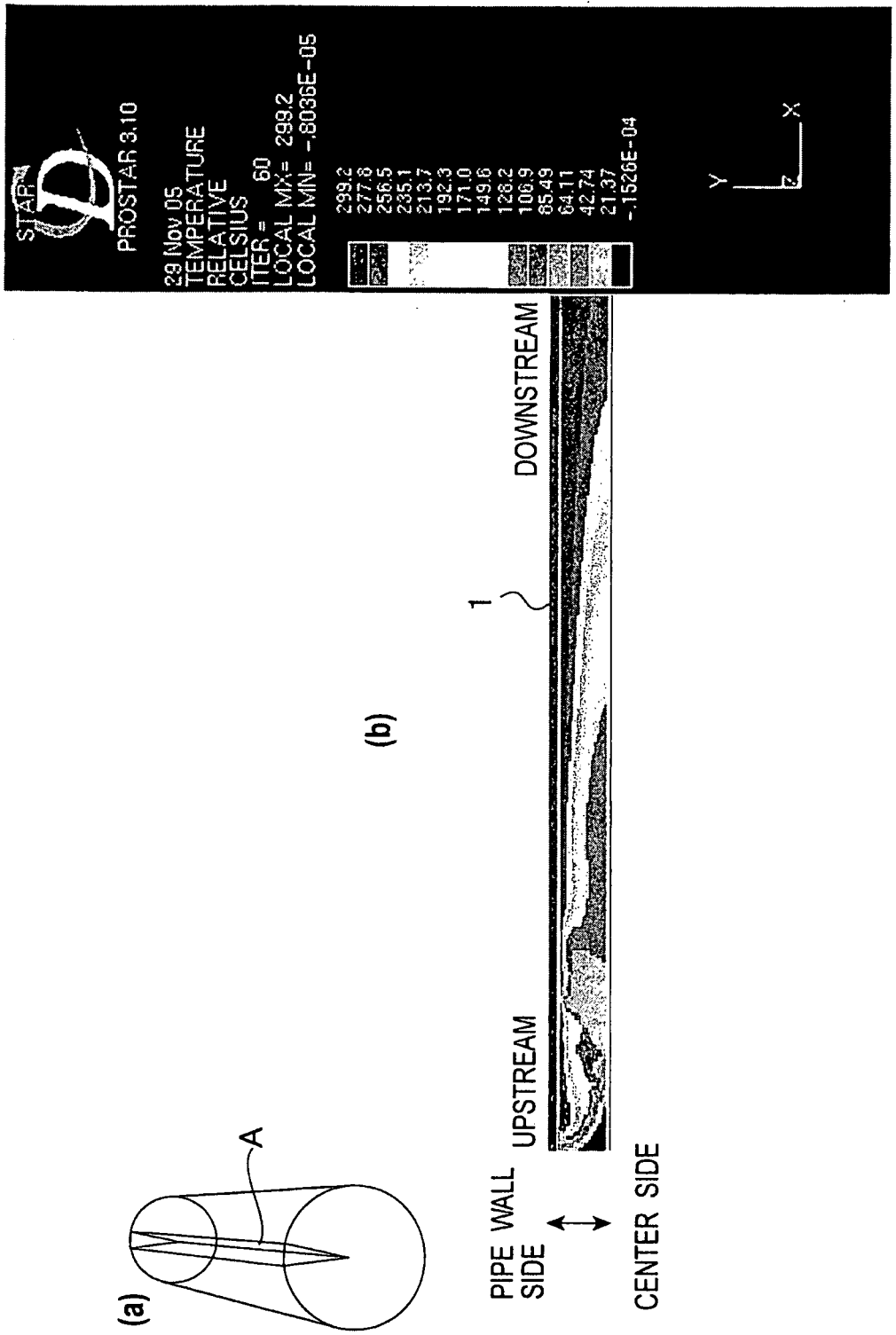
FIG. 5 shows simulation data representing a heat conduction state in a case where heptane is partially gasified: (a) shows a cylindrical pipe for use in simulation; and (b) shows a result of the simulation.

Note that, as shown in simulation data of FIG. 5, in heptane in which a pipe wall temperature is 300° C., a pressure is 0.1 MPa and thermal conductivity is less than 0.06 W·m$^{-1}$ K$^{-1}$, it is assumed that a portion to which the heat does not transfer occurs from the inner wall side to the center side by heptane that has turned to the evaporated state.

Figure 6:
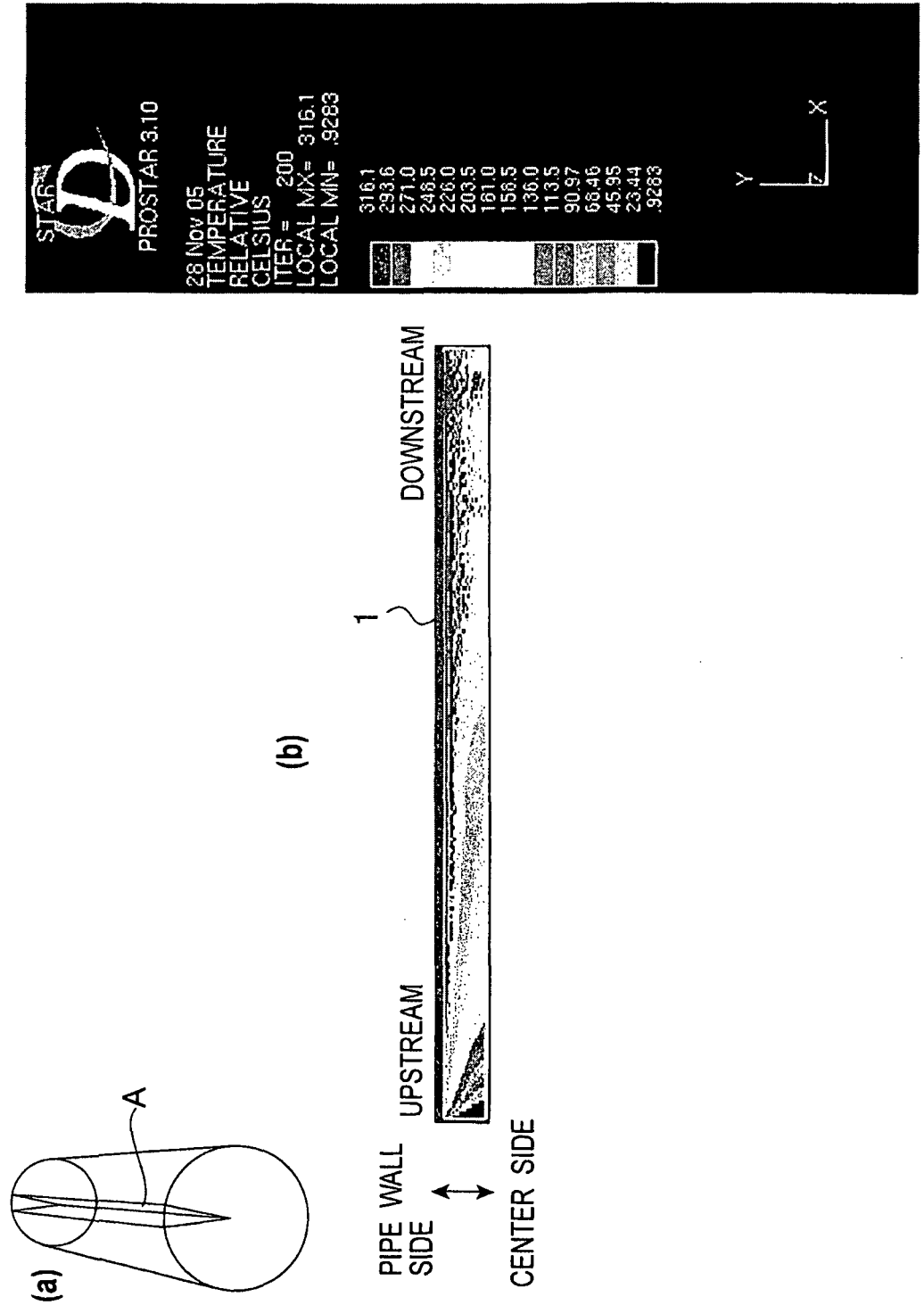
FIG. 6 shows simulation data representing a heat conduction state in a case where heptane is liquefied: (a) shows a cylindrical pipe for use in simulation; and (b) shows a result of the simulation.

Meanwhile, as shown in simulation data of FIG. 6, in heptane in which a temperature is 300° C. and a pressure is 3.0 MPa, thermal conductivity thereof is good since heptane does not turn to the evaporated state, and the catalyst temperature does not become extraordinarily high, whereby it is assumed that the sintering is suppressed.

The simulation data of FIG. 5 and FIG. 6 will be described more in detail.

Simulation was performed under the following conditions. Heptane was flown through a cylindrical pipe with a cross-sectional area of 1 cm$^3$ and a length of 10 cm from an upstream (left side in the drawings) to a downstream (right side in the drawings). At this time, a temperature distribution was calculated in the case of fixing the pipe wall temperature at 300° C. and changing the pressure with respect to the critical pressure of 2.74 MPa of heptane. Note that symmetry of the cylindrical pipe was utilized for such calculation, and the temperature distribution was calculated only in a region A which represents a center angle of 15° of the cylindrical pipe.

First, FIG. 6 is the simulation data of the temperature distribution in the case where the pressure of heptane was 3.0 MPa. Viewing the temperature distribution, it is understood that a cross-sectional temperature distribution of the pipe at a downstream terminal end thereof became uniform by setting the pressure of heptane at the above-described pressure. The heat of the pipe wall is transmitted to the fuel efficiently as described above, whereby the fuel in the vicinity of the pipe wall is not heated locally, and the carbon deposition can be avoided.

Meanwhile, FIG. 5 is the simulation data of the temperature distribution in the case where the pressure of heptane was 0.1 MPa. This pressure is not in a subcritical region or a supercritical region with respect to the critical pressure of heptane. In this pressure range, the cross-sectional temperature of the pipe is distributed over a considerably wide range at the downstream terminal end of the cylindrical pipe, and it is understood that the temperature is nonuniform particularly at a portion denoted by reference symbol B in the drawing.

Moreover, in the fluid reforming method of the present invention, the fuel can be reformed while further adding the reactant into the flow channel. In such a way, the reforming reaction can be accelerated more. Furthermore, in the case where the decrease of the fuel density occurs, the pressure of the fuel is increased, whereby the local heating is suppressed, thus making it possible to avoid the deterioration of the catalyst. As the above-described reactant, for example, there are mentioned hydrocarbons, alcohols, water, oxygen, hydrogen peroxide, carbon dioxide or nitrogen oxide, and arbitrary combinations thereof.

Furthermore, also in the case of reforming the fuel while mixing the fuel and the reactant with each other in the flow channel, it is preferable to control a pressure of such a mixture of the fuel and the reactant so that the thermal conductivity can be 0.06 W·m$^{-1}$ K$^{-1}$ or more. The pressure of the mixture is increased, whereby a density thereof is increased, the thermal conductivity is ensured, and the deterioration of the catalyst can be thereby avoided. Note that, even if such a mixed state is made, when the local thermal conductivity is decreased, there occurs a case where the catalyst temperature becomes extraordinarily high and the deterioration of the catalyst is accelerated.

Moreover, it is preferable to control the pressure of the mixture in the flow channel at critical pressures of the fuel and the reactant or more. In this case, basically, the fuel does not become gaseous, and accordingly, the heat insulation state can be avoided. Moreover, in the case where the decrease of the density occurs, the pressure of the fuel is increased to the critical pressure or more, whereby the local heating is suppressed, thus making it possible to avoid the deterioration of the catalyst and the occurrence of the caulking.

The present invention will be described below more in detail by examples, however, the present invention is not limited to these examples.

EXAMPLE 1

Figure 9:
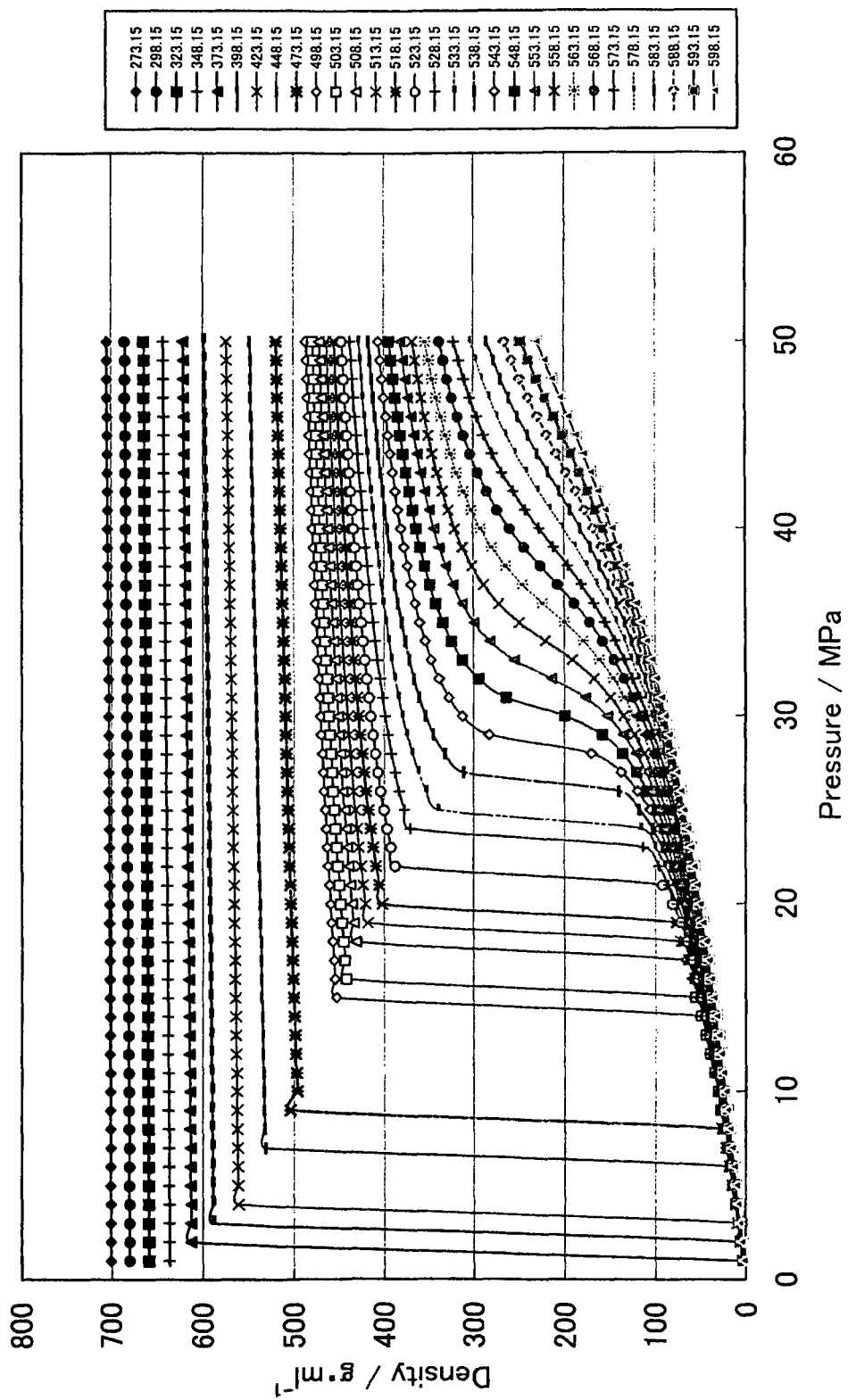
FIG. 9 is a graph showing relationships between pressures and densities of heptane at respective temperatures.

The fluid reforming apparatus as shown in FIG. 7 was used. Note that the heating chamber has a cylindrical shape with a cross-sectional area of 1 cm$^2$ and a length of 10 cm, and the same is applied also to the following examples. Then, the state of heptane in the heating chamber was changed by the fluid heating device and the pressure control device. Pressures and densities of heptane at respective temperatures in this case were measured. Obtained results are shown in FIG. 9. FIG. 9 is a graph showing relationships between the pressures and densities of heptane at the respective temperatures.

EXAMPLE 2

Figure 10:
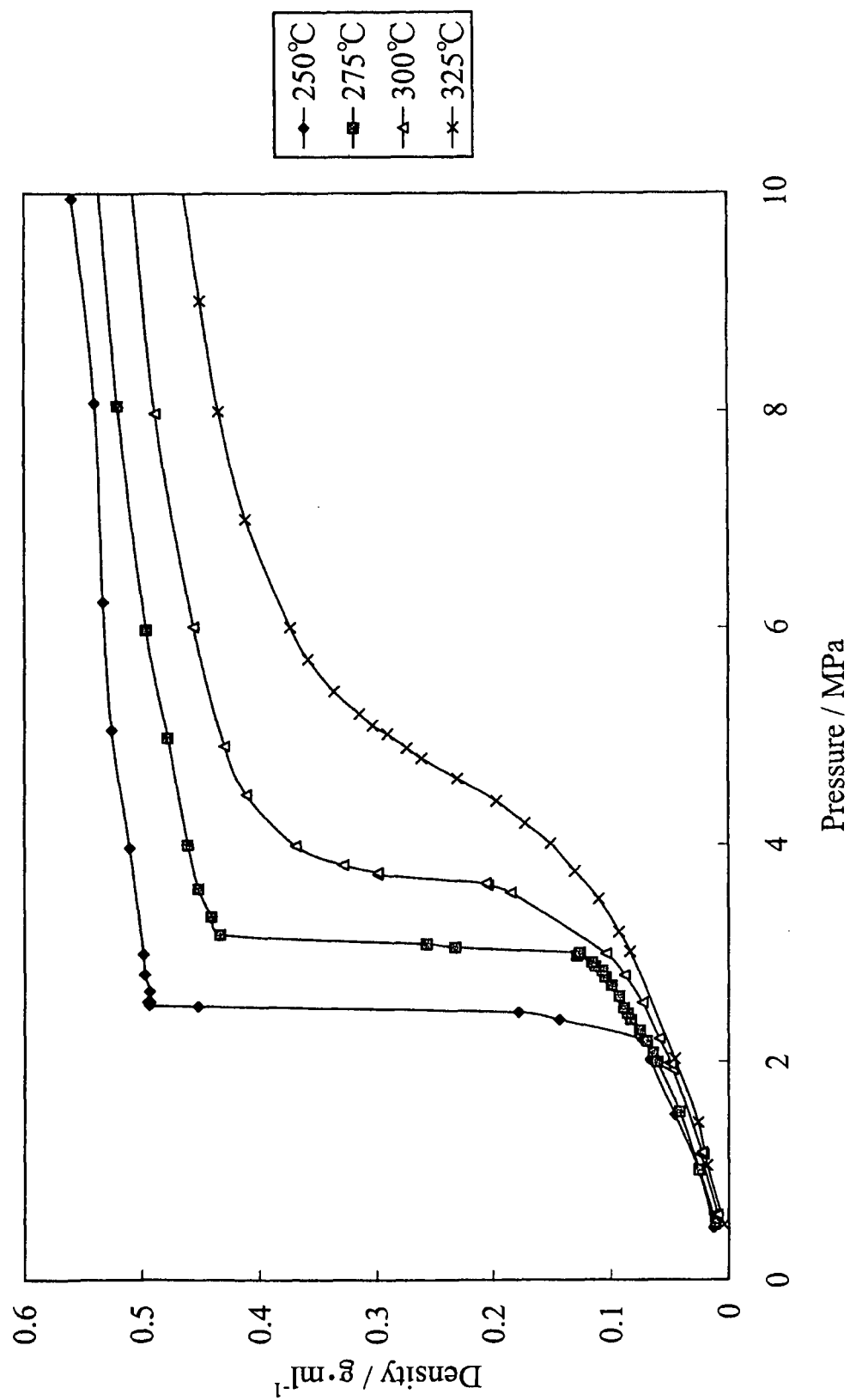
FIG. 10 is a graph showing relationships between pressures and densities of gasoline at respective temperatures.

The fluid reforming apparatus as shown in FIG. 7 was used, and the state of the gasoline in the heating chamber was changed by the fluid heating device and the pressure control device. Pressures and densities of the gasoline at respective temperatures in this case were measured. Obtained results are shown in FIG. 10. FIG. 10 is a graph showing relationships between the pressures and densities of the gasoline at the respective temperatures.

EXAMPLE 3

Figure 11:
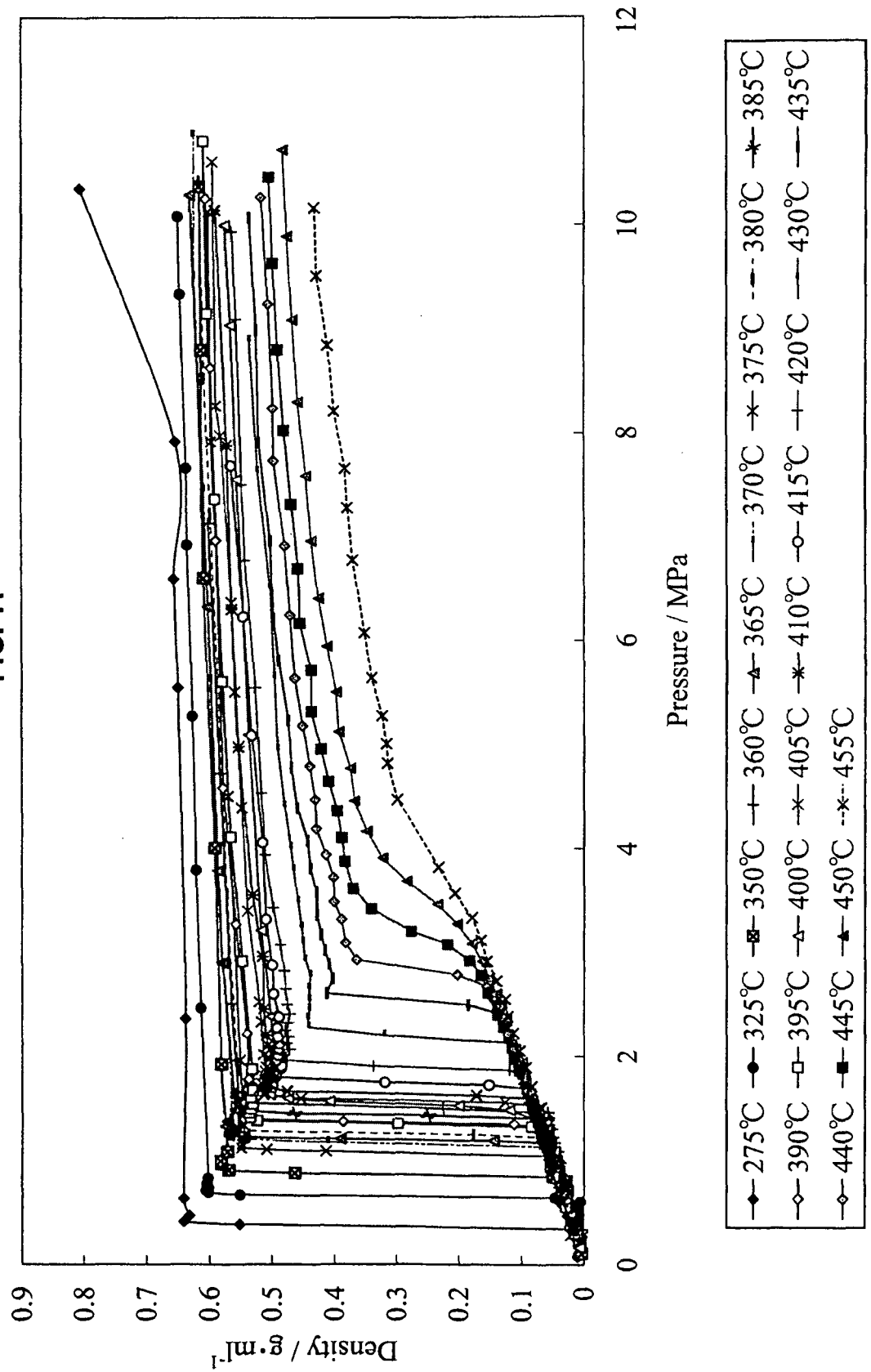
FIG. 11 is a graph showing relationships between pressures and densities of light oil at respective temperatures.

The fluid reforming apparatus as shown in FIG. 7 was used, and the state of the light oil (JIS No. 2) in the heating chamber was changed by the fluid heating device and the pressure control device. Pressures and densities of the light oil at respective temperatures in this case were measured. Obtained results are shown in FIG. 11. FIG. 11 is a graph showing relationships between the pressures and densities of the light oil at the respective temperatures.

The entire contents of Japanese Patent Application No. 2006-213213 (filed on Aug. 4, 2006) and Japanese Patent Application No. 2007-198633 (filed on Jul. 31, 2007) are incorporated herein by reference.

The description has been made above of the contents of the present invention along the embodiment and the examples; however, the present invention is not limited to the description of these, and it is obvious for those skilled in the art that a variety of modifications and improvements are possible.

INDUSTRIAL APPLICABILITY

In accordance with the present invention, the pressure of the fluid is adapted to be controlled so that the thermal conductivity thereof cannot be decreased. Accordingly, the local heating of the fluid in the flow channel is avoided, thus making is possible to suppress the carbon deposition (occurrence of the scorch and the caulking) and the sintering of the catalyst. In such a way, it becomes possible to reduce the region in which the fuel (fluid) is reformed, whereby the fluid reforming apparatus can be reduced in size.

The invention claimed is:

1. A fluid reforming apparatus, comprising:
a flow channel in which a catalyst is fixed to an inner wall of the flow channel;
a fluid heating device which heats a fluid to be reformed by the catalyst and heats the catalyst in the flow channel;
two catalyst temperature measuring devices which measure temperatures of the catalyst and are disposed in the flow channel, one of the catalyst temperature measuring devices being arranged on an upstream side of the flow channel in a flow direction of the fluid, and the other being arranged on a downstream side of the flow channel in the flow direction; and
a pressure control device which controls a pressure of the fluid in the flow channel so that the fluid can have a target pressure,
wherein the pressure control device is programmed to increase the target pressure when a difference between the temperatures of the catalyst measured by the two catalyst temperature measuring devices exceeds a predetermined value during a period while the fluid in the flow channel is being heated up to a target temperature by the fluid heating device.

2. The fluid reforming apparatus according to claim 1, wherein the pressure control device is programmed to control the pressure of the fluid so that thermal conductivity of the fluid existing in a vicinity of the catalyst is 0.06 W·m$^{-1}$ K$^{-1}$ or more.

3. The fluid reforming apparatus according to claim 1, wherein the pressure control device is programmed to control the pressure of the fluid at a critical pressure thereof or more.

4. The fluid reforming apparatus according to claim 3, wherein the pressure control device is programmed to control the pressure of the fluid at 180% or more of the critical pressure.

5. The fluid reforming apparatus according to claim 4, wherein the pressure control device is programmed to control the pressure of the fluid at 300% or more of the critical pressure.

6. The fluid reforming apparatus according to claim 1, wherein the fluid is reformed while further adding a reactant into the flow channel.

7. The fluid reforming apparatus according to claim 6, wherein the pressure control device is programmed to control a pressure of a mixture of the fluid and the reactant so that thermal conductivity of the mixture of the fluid and the reactant, which exist in a vicinity of the catalyst, is 0.06 W·m$^{-1}$ K$^{-1}$ or more.

8. The fluid reforming apparatus according to claim 6, wherein the pressure control device is programmed to control a pressure of a mixture of the fluid and the reactant in the flow channel at a critical pressure of the mixture of the fuel and the reactant or more.

9. The fluid reforming apparatus according to claim 1, wherein the fluid is at least one selected from the group consisting of gasoline, light oil, liquefied natural gas, liquefied petroleum gas and biofuel.

10. The fluid reforming apparatus according to claim 6, wherein the reactant is at least one selected from the group consisting of hydrocarbons, alcohols, water, oxygen, hydrogen peroxide, carbon dioxide and nitrogen oxide.

11. The fluid reforming apparatus according to claim 1, wherein the catalyst comprises a catalyst layer disposed on the inner wall of the flow channel.

12. The fluid reforming apparatus according to claim 1, wherein the two catalyst temperature measuring devices are arranged in an inside of the catalyst.

\* \* \* \* \*